(12) United States Patent
Freed et al.

(10) Patent No.: US 7,039,053 B1
(45) Date of Patent: May 2, 2006

(54) PACKET FILTER POLICY VERIFICATION SYSTEM

(75) Inventors: Michael Freed, Arlington Heights, IL (US); Michael S. Borella, Naperville, IL (US); Satish Amara, Mount Prospect, IL (US)

(73) Assignee: 3Com Corporation, Marlborough, MA (US)

( * ) Notice: Subject to any disclaimer, the term of this patent is extended or adjusted under 35 U.S.C. 154(b) by 993 days.

(21) Appl. No.: 09/796,314

(22) Filed: Feb. 28, 2001

(51) Int. Cl.
*H04L 12/56* (2006.01)

(52) U.S. Cl. .................................. 370/392; 709/223
(58) Field of Classification Search ............... 370/389, 370/392, 395.21, 395.31, 395.43; 709/220, 709/223, 238
See application file for complete search history.

(56) References Cited

U.S. PATENT DOCUMENTS

| 5,889,953 A * | 3/1999 | Thebaut et al. ............ 709/221 |
| 5,951,651 A | 9/1999 | Lakshman et al. |
| 6,289,013 B1 * | 9/2001 | Lakshman et al. ......... 370/389 |
| 6,327,618 B1 * | 12/2001 | Ahlstrom et al. ........... 709/223 |
| 6,529,508 B1 * | 3/2003 | Li et al. ..................... 370/392 |
| 6,581,093 B1 * | 6/2003 | Verma ........................ 709/220 |
| 6,587,466 B1 * | 7/2003 | Bhattacharya et al. .. 370/395.21 |
| 6,601,082 B1 * | 7/2003 | Durham et al. ............. 718/100 |
| 6,691,168 B1 * | 2/2004 | Bal et al. .................... 709/238 |
| 2001/0039576 A1 * | 11/2001 | Kanada ...................... 709/223 |

OTHER PUBLICATIONS

Lakshman, T.V. et al., "High-Speed Policy-based Packet Forwarding Using Efficient Multi-dimensional Range Matching", *Bell Laboratories*, Holmdel, NJ.

* cited by examiner

*Primary Examiner*—Steven Nguyen
*Assistant Examiner*—Clemence Han
(74) *Attorney, Agent, or Firm*—McDonnell Boehnen Hulbert & Berghoff LLP

(57) ABSTRACT

A method for determining the validity of an n-dimensional policy table in a router. The router may include a processor, a memory (e.g. ROM, flash memory, non-volatile memory, hard disk, etc.), and two or more policy rules stored in the memory. Each policy rule may have one or more dimensions (or parameters), designated generally by the symbol n. In accord with the method, the processor may make a determination whether any particular policy rule in the table intersects any subsequent policy rule in the table in every dimension n. If no rules in the table intersect in every dimension n, then the policy table is valid, and the router may operate normally.

13 Claims, 11 Drawing Sheets

| Rule | Src IP/mask | Dst IP/mask | Src Port | Dst Port | Action |
|---|---|---|---|---|---|
| 1 | 149.112.240.0/24 | 128.153.4.128/25 | * | 25 | Low priority |
| 2 | 149.112.240.0/24 | 128.153.4.128/25 | * | 1-1023 | High priority |
| 3 | 169.254/16 | 10.12.0.0/16 | * | * | High priority |
| 4 | 169.254/16 | 10.0.0.0/8 | * | * | Translate |
| 5 | 149.112.0.0/16 | * | * | * | Low Priority |
| 6 | * | * | * | * | Drop |

PACKET FILTER POLICY VERIFICATION SYSTEM

BACKGROUND OF THE INVENTION

1. Field of the Invention

The present disclosure relates to packet forwarding engines and, more particularly, to router algorithms and architectures for supporting packet filter operations.

2. Description of Related Art

Routers in a communication network, for example, a TCP/IP network, may provide a policy-based packet forwarding function where information, usually in the form of packets, is switched or routed to a further destination, e.g., along a network link. Data packets typically include, in addition to their data payload, headers that contain information about the packet itself, such as source and destination internet protocol (IP) addresses, source and destination ports, type-of-service bits, the IP next-protocol field, etc.

Packet filtering is a general mechanism by which a router or remote access server determines how to apply various policies to incoming packets. Types of policy decisions that may be applied to packets include routing decisions, priority queuing, quality of service (QoS) marking, port and address translation, dropping of unauthorized packets, etc. Policy decisions may be based on any information contained a packet header or other considerations, such as incoming or outgoing interfaces. Certain applications may also be subject to policy decisions based on the payloads, rather than the headers, of packets. For example. FTP packets could be routed based on based on input or output port numbers.

Most policy rules are applicable to a range of parameters or dimensions, such as source and destination addresses, ports, etc., rather than exact values. Policy-based routing may thus operate on any or all of a large number, n, of ranged dimensions.

Information in a policy table is typically a linear list of ranged parameters upon which a router may make policy decisions regarding the actions it will take on incoming data packets. To implement a particular policy decision, a router receives a data packet and executes a routine that uses the policy table to determine which policy to apply. Policy tables are read from the top down by a router's control mechanism. Because of this, if two or more rules may apply to a single packet but any rule in the table is not a subset of one of the other rules that applies to the packet, the table is invalid, because a packet that matches both rules will only be subject to the first rule encountered in the table.

Similarly, if some rule, A, is a subset of a more general rule, B, then the table is valid only if rule A precedes rule B in the policy table; if rule B precedes rule A, a packet that matches both rules will only be subject to rule B, preventing rule A from ever being applied to a packet.

Policy tables are typically generated offline by a router. For example, a typical enterprise gateway router includes a routing module, a network address translator, differential services, integrated services, and a firewall. Since each of these modules dumps its policy to the policy table, a table may contain hundreds or even thousands of rules for routing packets. Because a router may generate such a large number of rules, it is difficult for an administrator to determine if a particular policy table is valid. Further, routers typically do not automatically ensure that policy tables are valid. Accordingly, there is a need to easily and automatically determine whether or not a given policy table is valid, given n-ranged parameters or dimensions with which packets may be filtered.

SUMMARY OF THE INVENTION

The foregoing and other objects and advantages may be attained by a computer-implemented method for determining whether a given policy table having n-ranged parameters is valid.

In one aspect, an exemplary embodiment of the present invention may take the form of a computer-implemented method for determining the validity of an n-dimensional policy table in a router. In this embodiment, the router may include a processor, a memory (e.g., ROM, flash memory, non-volatile memory, hard disk, etc.), and two or more policy rules stored in the memory. Each policy rule may have one or more dimensions (or parameters), designated generally by the symbol n. In accord with the method, the processor may make a determination whether any particular policy rule in the table intersects any subsequent policy rule in the table in every dimension n. If no rules in the table intersect in every dimension n, then the policy table is valid, and the router may operate normally. The processor may also cause the router to notify an administrator that the policy table is valid once the process is complete.

In another aspect, an exemplary router's processor may make a determination whether a particular policy rule intersects any subsequent policy rule in every dimension n to which policy rules apply without the particular policy rule being a subset of the subsequent rule. To accomplish this, the processor may determine whether the maximum value of at least one dimension i, where i is an index number between zero and n, of a particular policy rule that intersects a subsequent policy rule is greater than the maximum value of the corresponding dimension i of the subsequent rule. If the maximum value of a dimension i of a rule is greater than the maximum value of dimension i of an intersected subsequent rule, the dimension of the particular rule is not "within" the subsequent rule.

The processor may also determine whether the minimum value of at least one dimension i of a particular policy rule that intersects a subsequent policy rule is less than the minimum value of the corresponding dimension i of the subsequent rule. If the minimum value of a dimension i of a rule is less than the minimum value of dimension i of an intersected subsequent rule, the dimension of the particular rule is not "within" the subsequent rule.

If any dimension i of a particular rule is not within the corresponding dimension i of a subsequent rule as determined above, the policy table is invalid because only the first rule will ever be applied to a packet that matches both rules. If the table is invalid, the processor may cause the router to take appropriate action such as, for example, closing the communication channel or notifying an administrator.

In yet another aspect, an exemplary router's processor may validate a policy table by first determining whether a particular policy rule intersects any subsequent policy rule in all dimensions n. If the rules do so intersect, the processor may next determine whether the particular policy rule is a subset in all dimensions n of all subsequent policy rules with which it intersects. If one rule is a subset of another, that subset rule may be said to be a narrower rule than the other rule, since, by definition, it applies to a narrower range of parameters.

The router's processor may determine if any particular rule is a subset of a subsequent rule by comparing the maximum and minimum values represented by the ranged dimensions of the intersecting rules. If every dimension i of the particular rule is within every corresponding dimension i of the intersected subsequent rule, then the particular rule is a subset of the subsequent rule. As described above, a particular rule is within a subsequent rule if its maximum value for every dimension i is less than or equal to the corresponding maximum value for every dimension i of the subsequent rule, and, similarly, its minimum value for every dimension i is greater than or equal to the corresponding minimum value for every dimension i of the subsequent rule.

If all particular policy rules that intersect subsequent policy rules are subsets of those subsequent policy rules, the table is valid, since any narrower rule will be applied to the packet before a more general rule is reached. Conversely, if any subsequent policy rule that intersects a particular policy rule is a subset of the particular policy rule, the table is invalid, as the more general rule will prevent the narrower subsequent rule from ever being applied to a packet that matches both rules. In such a case, the processor may cause the router to take appropriate action such as, for example, closing the channel or notifying an administrator.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present embodiment are described herein with reference to the drawings in which:

FIG. 4 illustrates a policy table for use in a packet-filtering router of FIG. 3;

DETAILED DESCRIPTION OF AN EXEMPLARY EMBODIMENT

Figure 1:
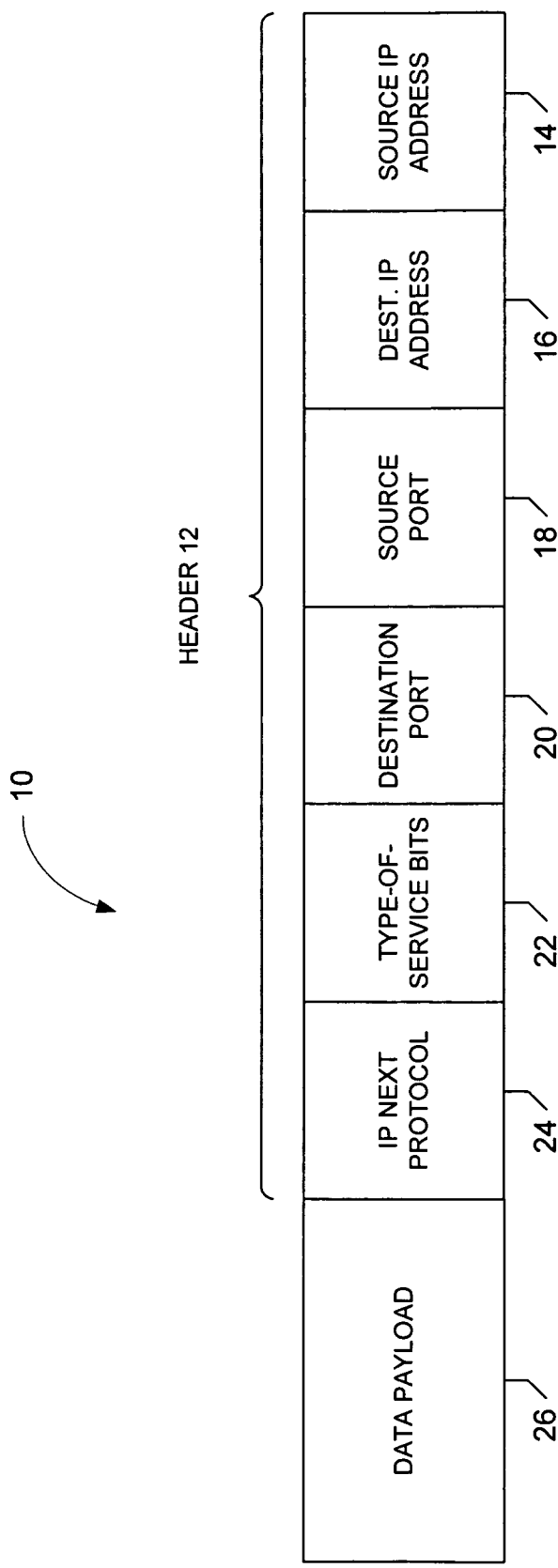
FIG. 1 is a diagram illustrating a typical IP packet.

Referring to the drawings, FIG. 1 illustrates a typical IP packet 10. Packet 10 may comprise a header 12 and a data payload 26. More specifically, header 12 may be comprised of source IP address 14, destination IP address 16, source port 18, destination port 20, type of service bits 22, and IP next-protocol field 24. For purposes of illustration, each of the parameters in the header represents a dimension n.

Figure 2:
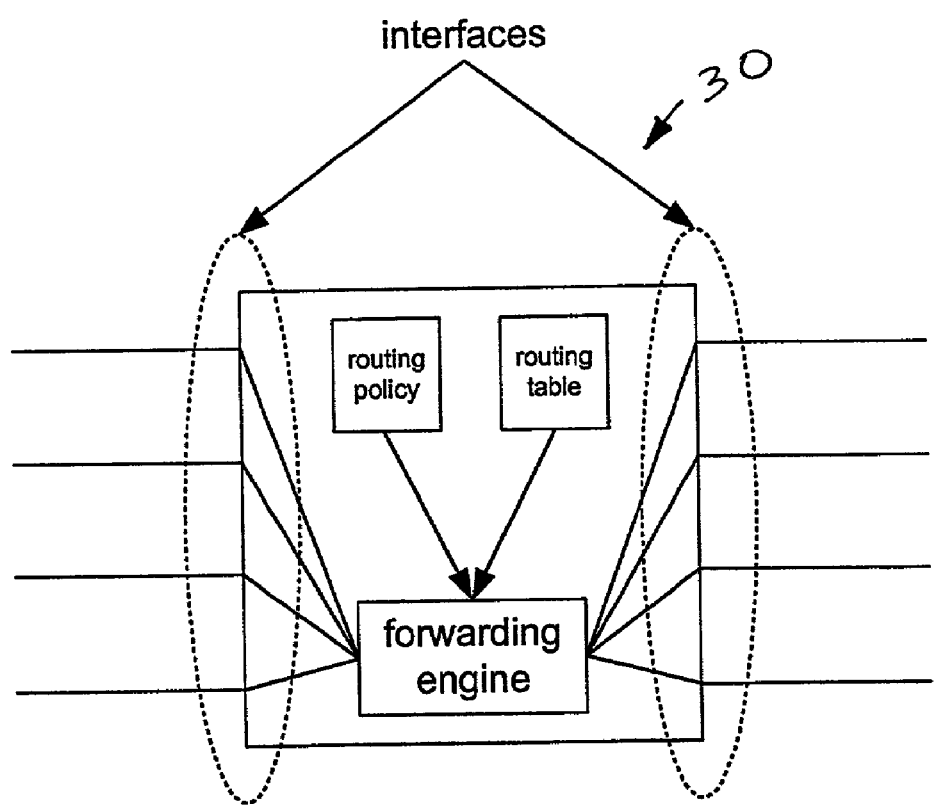
FIG. 2 generally illustrates a packet router of an exemplary embodiment.
Figure 3:
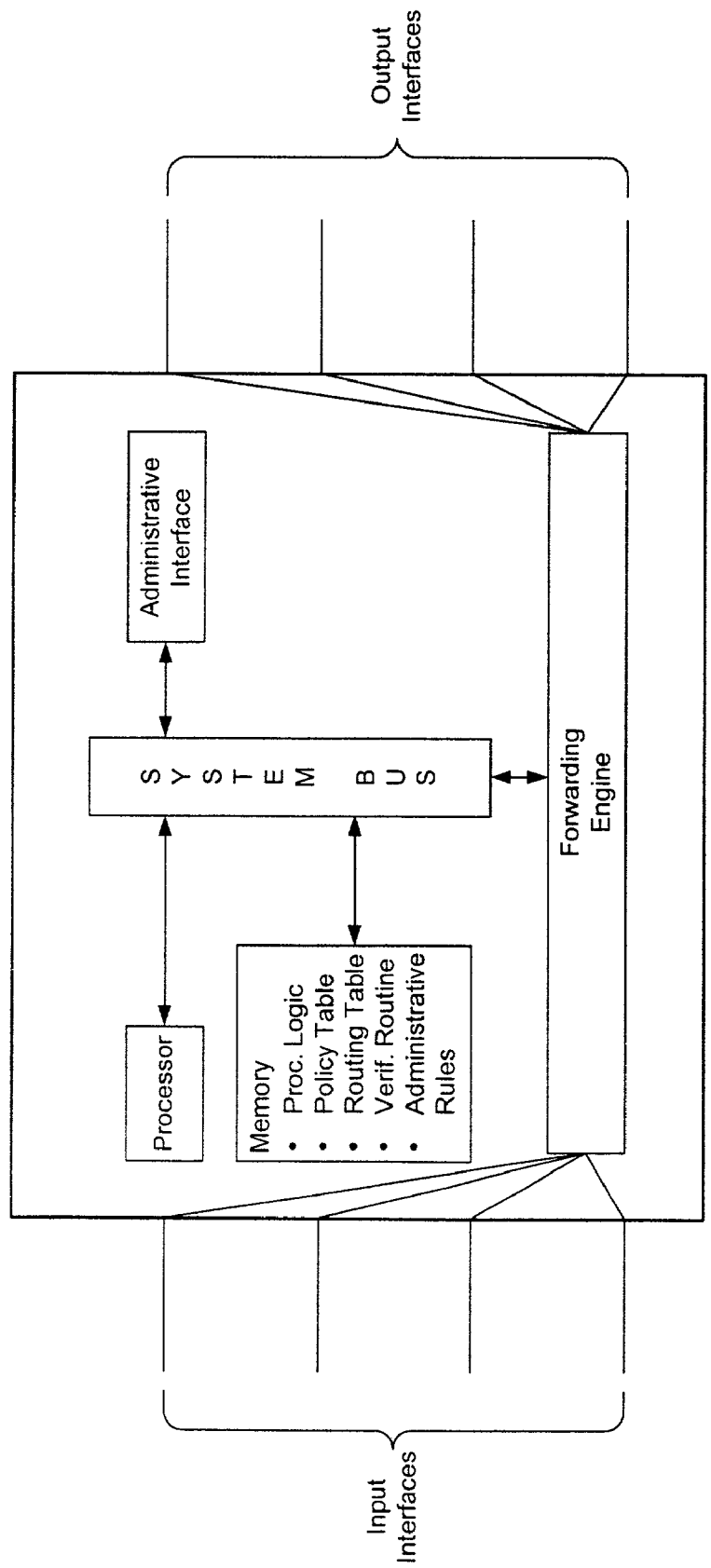
FIG. 3 generally illustrates the packet router of FIG. 2.

FIG. 2 illustrates router 30 that contains policy-based logic as well as a conventional routing table, both of which interact with router 30's forwarding engine to determine how to route incoming packets. In FIG. 3, exemplary router 30 is shown in more detail. For purposes of illustration, this description will focus on the operation of policy table verification in router 30. Router 30 may, by way of example, include a processor 32 (e.g., an integrated circuit microprocessor), a memory 34 (e.g., ROM, flash memory, non-volatile memory, hard disk, etc.), an administrative interface 38, and a forwarding engine 40, all of which may be interconnected by a system bus. This particular configuration is not crucial to the functioning of the present invention. For example, the present invention could be implemented by a device without a system bus and having a memory and processor contained in one integrated circuit. Also, one or even all of the functions of the processor and memory may be implemented outside the router. Further, those skilled in the art will appreciate that many of the elements described in this exemplary embodiment are functional entities that may be implemented as discrete components or in conjunction with other components, in any suitable combination and location.

Memory 34 may include more than one physical element, and may also include various components: an operating system for processor 32; a policy table; a routing table; and a set of stored logic by which the policy table's validity may be verified. Provided with the present disclosure those of ordinary skill in the art can readily prepare appropriate computer instructions to perform the described functions.

Router 30 applies routing decisions to incoming packets based on policy rules contained in policy tables such as policy table 40 shown in FIG. 4. Parameters stored in a policy table are typically expressed as (or can be converted to) ranges rather than discrete values. For example, an IP address with a mask indicates a range of IP addresses, which is a contiguous set of IP addresses represented by a 32-bit number in dotted-decimal form together with a prefix (mask) length. As an illustration, the source IP address range 149.112.240.0/24, which is a parameter of rule 1 in policy table 40, represents source IP addresses 149.112.240.0 through 149.112.240.255, with the 24 highest order bits in the address "masked" by the number 255.255.255.0, leaving the 8 lowest order bits in the address to represent the range of source addresses. An asterisk (*) in policy table 40, such as destination IP of rule 5, represents a "wildcard" character, representing the entire range of the parameter (e.g., 0 through 4,294,967,295 for IP addresses).

Taking this illustration further, the source IP address range of rule 1 described above could be said to "intersect" with the source IP address range designated by 149.112.0.0/16, the ranged source IP dimension of rule 5. More specifically, the source IP address range represented by 149.112.240.0/24 is a subset of 149.112.0.0/16, because 149.112.240.0/24 represents the address range of 149.112.240.0 through 149.112.240.255, and 149.112.0.0/16 represents the broader address range of 149.112.0.0 through 149.112.255.255. As discussed in more detail below, an intersection of ranged parameters in a policy table gives rise to the possibility that the table is invalid, depending on whether or not one range is a subset of another, whether the rules intersect in more than one dimension, and also depending on which rule is first in the table.

An exemplary embodiment adds policy table validity verification functionality to a router. This functionality allows an administrator to determine if a policy table in a router, even one with a very large number of rules, is valid. Moreover, the table's validity may be constantly monitored, so that whenever the table is modified, an administrator may be notified that the table is no longer valid as soon as it is rendered invalid by the addition of a rule that improperly preempts another rule or rules in the table.

A router may make policy-based routing decisions based on information contained in packet headers, the payloads of packets, or other considerations. Examples of policy decisions that may be implemented include making routing decisions, priority queuing, quality of service ("QoS") marking, port and address translation, or dropping packets altogether. Thus, policy-based routing involves more actions, based on more dimensions, than conventional routing algorithms, which simply decide whether to forward a packet, drop it, or queue it prior to making a routing decision based on the source, destination, and some efficiency metric regarding the best path for the packet. Rules in a policy table are typically generated offline, and are also typically checked and applied to incoming packets by the router by reading them from the top-down.

Thus, during on-line operation, when the router receives a new packet, the packet is first checked to see if it matches the first rule in the table—that is, if each of the packet's parameters fall within the ranges specified by the first rule. For example, a packet with a source IP address of 149.112.240.168, a destination IP address of 128.153.4.200, any source port, and a destination port of 25 would match rule 1 in table 40 of FIG. 3, so the packet will be assigned a low priority. If a packet doesn't match any rule in the table, the last rule (such as rule 6 in table 40) will be applied to the packet by default after the packet has been compared to all the other rules in the table.

As soon as a packet matches a policy rule in the table, that rule is applied to the packet. Thus, a packet that is to be assigned a high priority gets that priority immediately and is not checked against any subsequent rules in the table for another match. For this reason, it is important that the policy table be valid, meaning that there are no rules in the table that could improperly prevent a subsequent rule from ever being implemented.

According to the exemplary embodiment, there are three conditions that must be checked to verify the validity of a policy table in a router. First, if all rules in the table are disjoint, that is, if there is at least one dimension in which every rule does not intersect a subsequent rule, the table will be valid because only one rule can be applied to any packet. The second condition is where two or more rules intersect but neither rule is a subset of the rule or rules it intersects. In this case, the table will be invalid, since a packet that matches both rules will only be subject to the first rule. The third condition to check for validity exists when a particular rule is a subset of another rule. If the particular rule is a subset of a subsequent rule, the table is valid. If, on the other hand, the subsequent rule is a subset of the particular rule, the table is invalid. In the latter case, the system may generate a message or a signal to inform an administrator that there is an impermissible subset order in the policy table. In such a case, the system may also generate a message to inform an administrator of the proper order of the rules, so that the table may be made valid. The three conditions of validity will be discussed in greater detail below.

Figure 5:
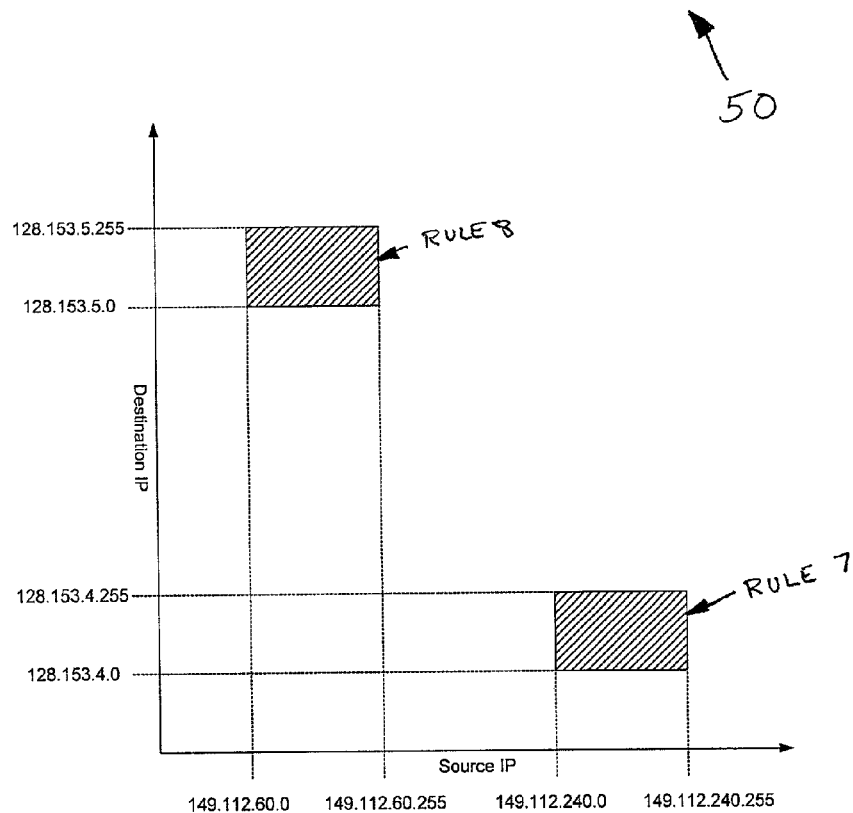
FIG. 5 illustrates a valid two-rule, two-dimension policy table and its corresponding graphical illustration of disjoint rules that can be used in the exemplary embodiment of FIG. 2.

Policy table 50, a table that contains only disjoint rules (not including the default rule) is illustrated in FIG. 5. For simplicity, FIG. 5 shows only two dimensions, but the principle it illustrates is the same regardless of the number of dimensions in the policy table. FIG. 5 illustrates two policy rules, rule 7 and rule 8, that apply to packets originating from two possible ranged source IP addresses, each with a corresponding ranged destination IP address (for practical reasons, the graphic representations of the policy rules in the drawings are not to scale). Neither the source IP address range or the destination IP address range of rules 7 and 8 intersect, so it is easy to see that only one rule will apply to a packet that matches either rule 7 or rule 8. Packets that match rule 7 will be assigned a high priority, packets that match rule 8 will be assigned a low priority, and all other packets will be dropped, in accordance with rule 9, the default rule. Since only one rule can ever be applied to any packet in this example, policy table 50 is valid.

Figure 9:
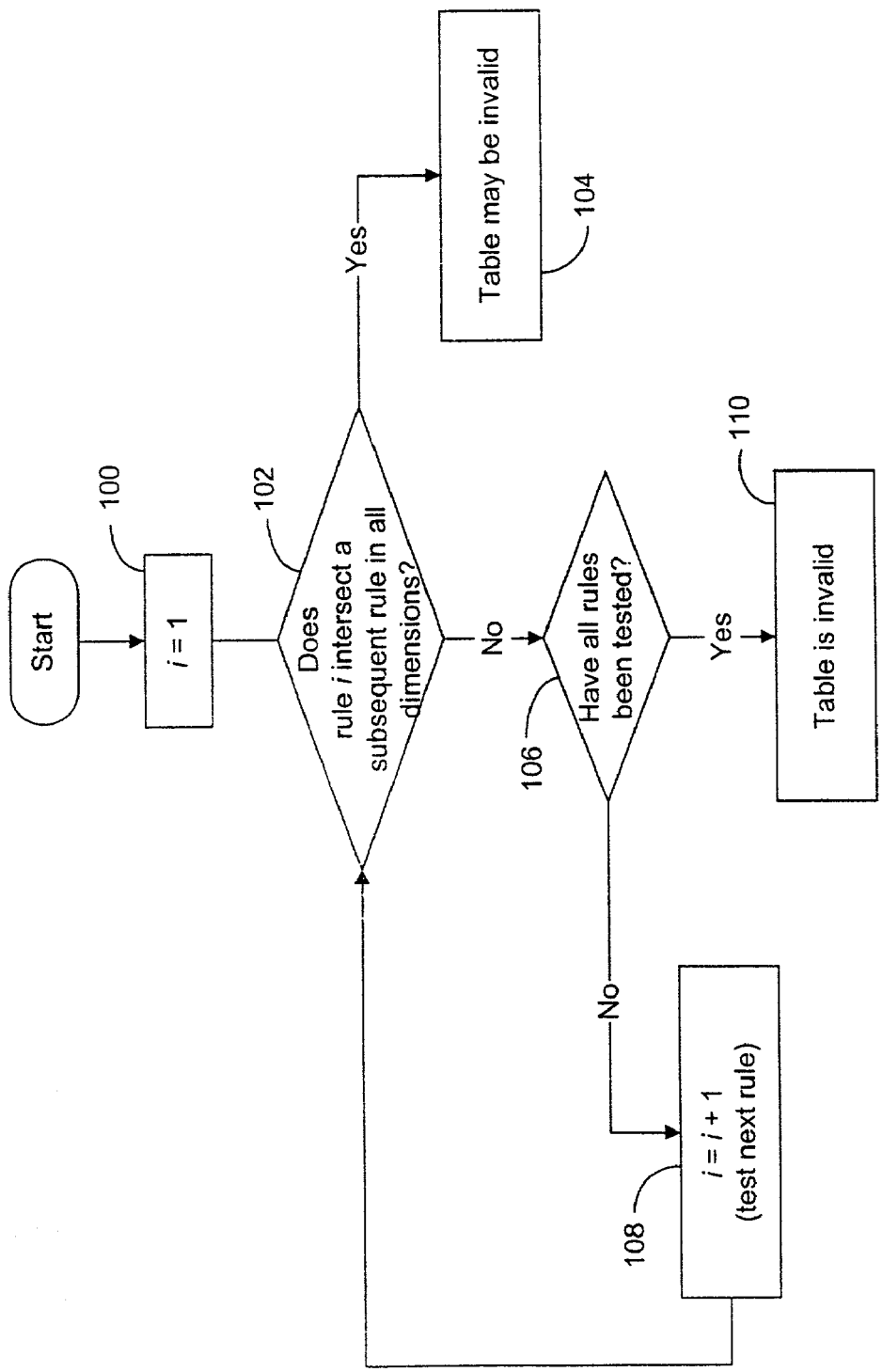
FIG. 9 illustrates an invalid two-rule, two dimension policy table and its corresponding graphical illustration of nested intersecting rules.

According to an exemplary embodiment of the present invention, the validity of a policy table such as policy table 50 in router 30 that contains only disjoint rules may be evaluated by using processor 32 to determine whether every dimension of any policy rule in the table intersects any subsequent policy rule or rules in the table in every corresponding dimension. The set of functions that processor 32 may execute to determine the validity of a policy table is illustrated in FIG. 9. First, in step 100, processor 32 may execute a routine to compare the range of every dimension of the first rule in the table to the range of every corresponding dimension of every subsequent rule in the table. If, in step 102, processor 32 determines that the first rule in the table does intersect in every dimension with one or more subsequent rules in the table, the table may be invalid, shown in step 104. To determine for certain if the table is invalid, further steps as discussed below may be executed by processor 32.

If the first rule in the table does not intersect any subsequent rule in the table in all dimensions, the processor will repeat the process until all the rules in the table have been tested, as shown in steps 100, 102, 106, and 108. If there is no intersection in any dimension for any rules in the table and all rules have been tested as determined in step 106, processor 32 will determine that the table is valid, as shown in step 110, because only one rule can apply to any incoming packet.

Figure 6:
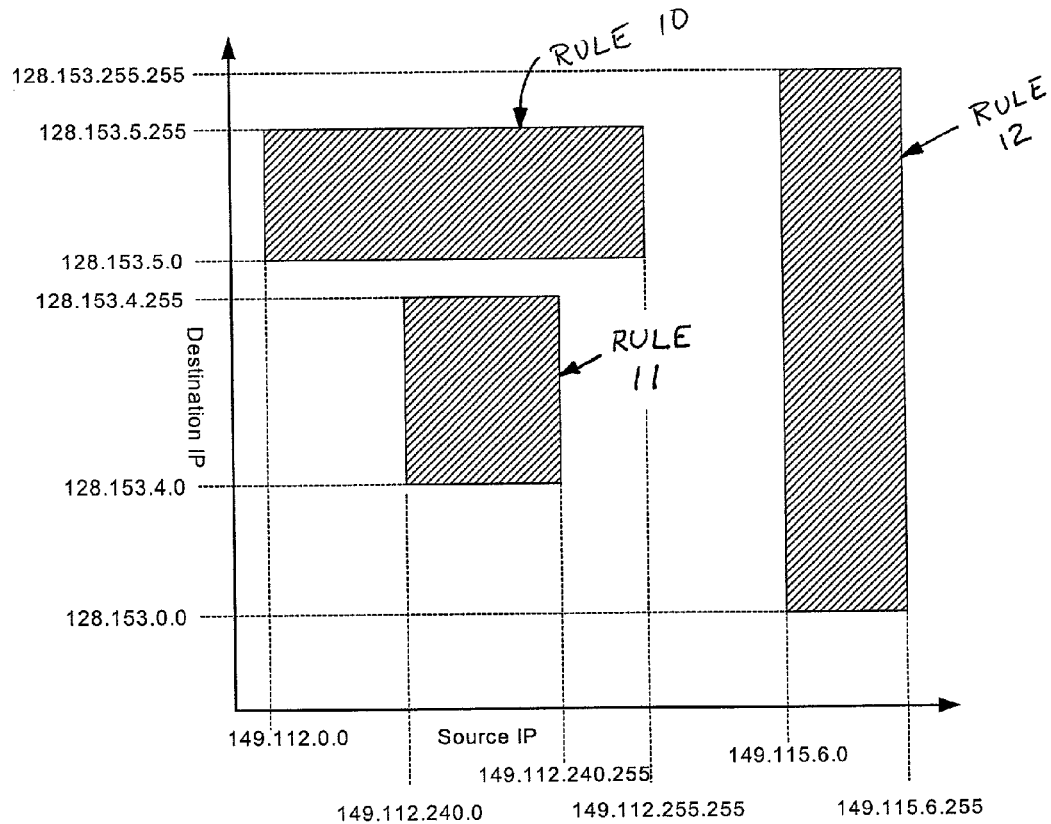
FIG. 6 illustrates a valid three-rule, two-dimension policy table and its corresponding graphical illustration of disjoint rules.
Figure 10:
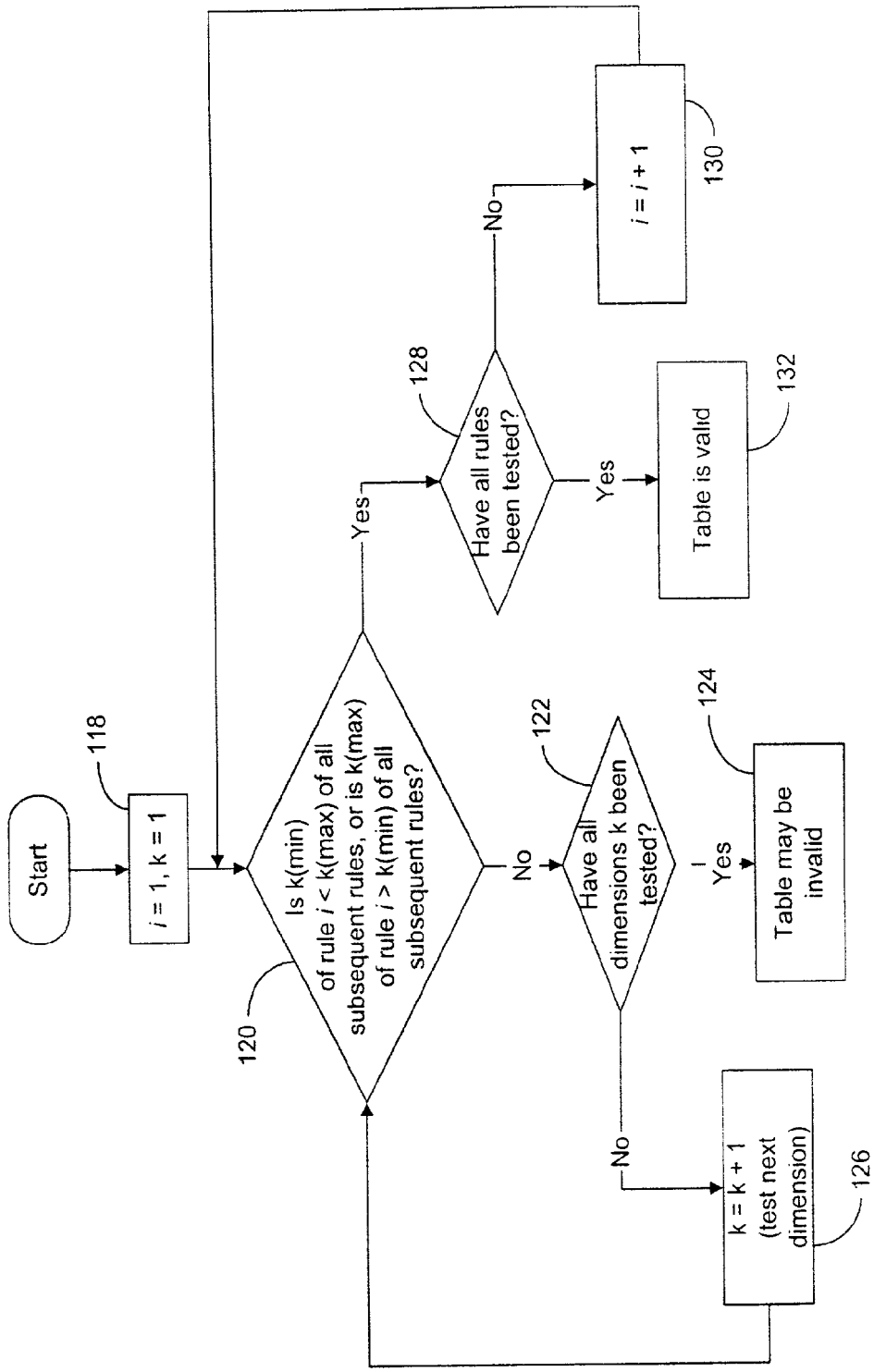
FIG. 10 is a flow chart illustrating the operation of an exemplary embodiment of the present invention.

The validity of policy table 60 shown in FIG. 6 is somewhat less clear, since there is an intersection in the source IP address range of rules 10 and 11, and there is also an intersection in the destination IP address range of rule 12 with the destination address ranges of rules 10 and 11. The graphic representation of Rules 10 and 11, however, shows that the rules are both disjoint in the dimension of the destination IP address, and rule 12 is disjoint with rules 10 and 11 in the dimension of the source IP address, so only one rule will apply to any packet regardless of the intersection of dimensions of the rules. As shown in FIG. 10, processor 32 would determine, at step 102, that rule 10 does not intersect rule 11 and 12 in all dimensions, and also that rule 11 does not intersect rule 12 in all dimension, so policy table 60 is valid.

Processor 32 may repeat the process of checking every dimension of every rule in an exemplary policy table until all dimensions of all rules have been checked for intersection, regardless of the number of rules or dimensions in the table.

As shown in greater detail in FIG. 10, according to the exemplary embodiment, processor 32 may execute a routine to determine whether a given dimension k of a particular rule i is disjoint from the same dimension k of a subsequent rule by determining that the minimum value of rule i's ranged dimension k is greater than the maximum value of the subsequent rule's corresponding dimension k per step 120. Processor 32 may also determine that the two rules are disjoint by determining that the maximum value of the particular rule's ranged dimension k is less than the minimum value of a subsequent rule's corresponding dimension k, per step 120.

For example, the minimum value of the destination IP address dimension (represented by k(min) in FIG. 10) of (particular) rule 10 is 128.153.5.0, while the maximum destination IP address (k(max)) of (subsequent) rule 11 is 128.153.4.255, so rules 10 and 11 are disjoint in at least the dimension of destination IP address. As shown in FIG. 10, processor 32 in this case would proceed from step 120 to step 128, to ensure that all rules in the table have been tested. Since rule 11 in this example has not been compared to subsequent rule 12, processor 32 may next execute step 130, incrementing rule index i by one to compare the dimensions of rule 11 to those of rule 12. Since the minimum source IP address k(min) of rule 12 (149.112.240.255) is greater than the maximum source IP address k(max) of rule 11 (149.112.60.255), processor 32 will determine, in step 120, that k(max) of rule 11 is less than k(min) of rule 12. Processor 32 will next determine, per step 128, that all rules in the table have been tested, so policy table 60 is valid.

By repeating this process for every rule in a given policy table, a processor in an exemplary router can determine whether the table is valid regardless of the number of rules or dimensions there are in the table.

Regardless of how many dimensions a policy table has, if two rules intersect in all dimensions except one, the table will not be invalid due to the partial intersection of those two rules, since only one of them will apply to any incoming packet. Further, an entire policy table will always be valid if there is at least one dimension in which any particular rule is disjoint with any subsequent rule in the table. Of course, the dimension in which two rules are disjoint need not be the same for two different rules in the table.

Figure 7:
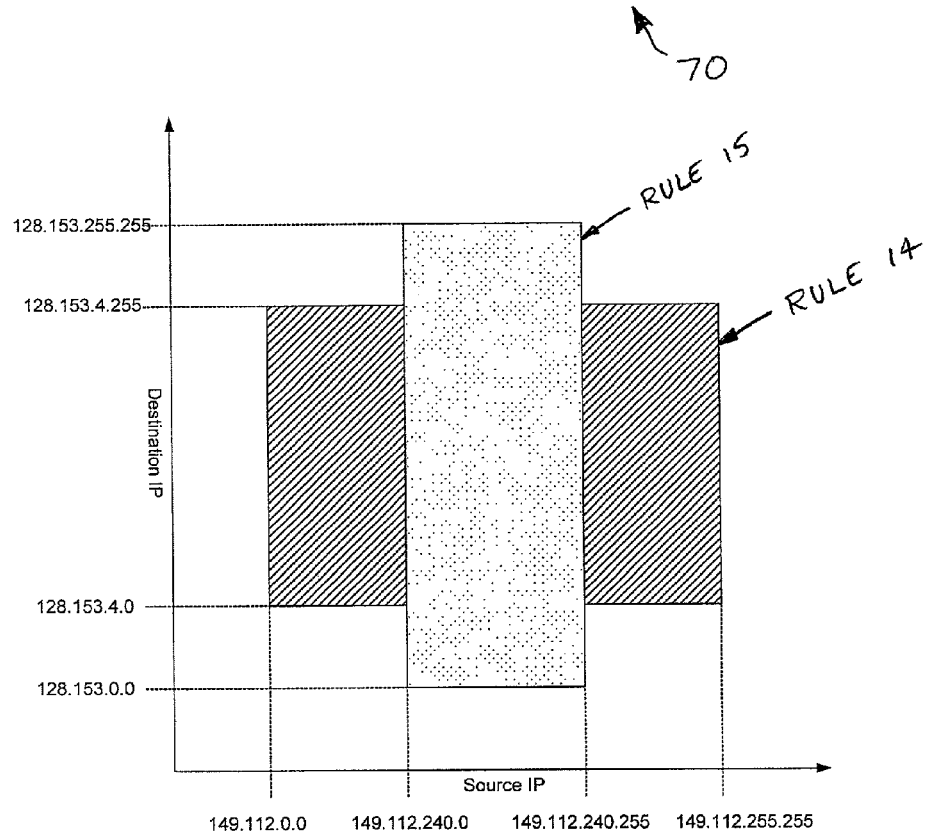
FIG. 7 illustrates an invalid two-rule, two-dimension policy table and its corresponding graphical illustration of intersecting rules.

FIG. 7 illustrates policy table 70 and a graphic representation of rules 14 and 15, each having two dimensions. Policy table 70 is invalid because rule 14 intersects rule 15 in all dimensions and neither rule is a subset of the other. In this example, rule 15 (applying high priority) will never be applied to a packet having parameters that match both rules 14 and 15. To further illustrate, a customer of a service provider may have contracted for high priority Quality of Service (QoS) for all packets addressed to a given destination. If packets that would otherwise be subject to that policy rule also match a previous policy rule with lower priority, the customer will not get the QoS for which the customer contracted.

The validity of a policy table, though, is not dependent on the order of priority of the intersecting rules. In other words, policy table 70 would also be invalid if rule 14 were the high-priority rule and rule 15 were the low-priority rule. In that case, rule 15 would never be applied to packets matching both rules, as before. This would result in a disadvantage to the service provider and an inefficient use of resources, since (low-priority) rule 15 would be applied to packets less often than it would be if the table were valid.

In the exemplary embodiment, processor 32 may determine that policy table 70 is invalid by repetitively comparing the dimensions of each policy rule in the table with the corresponding dimensions of every subsequent policy rule in the table. For example, if a particular policy rule intersects a subsequent rule or rules in the table in every dimension, processor 32 may next determine whether the particular rule tested is a subset of the subsequent rule or rules intersected in every dimension. As discussed above, if every particular rule is a subset of every subsequent rule that the particular rule intersects in every dimension, the table is valid.

Figure 11:
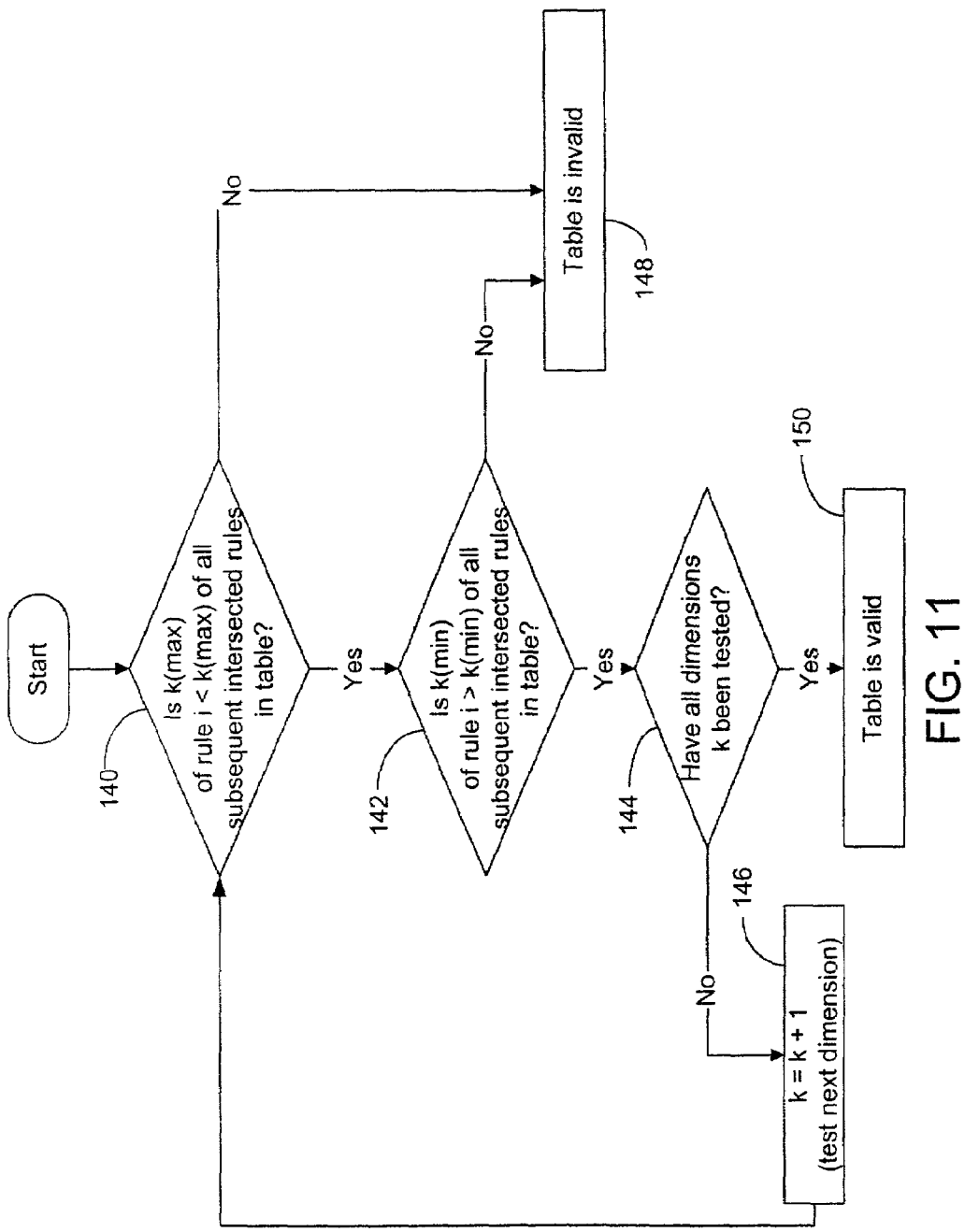
FIG. 11 is a flow chart further illustrating the operation of an exemplary embodiment of the present invention.

In order to determine whether a particular rule is a subset of every subsequent intersected rule, processor 32 may compare the dimensions of the rules to determine if the maximum value of each particular rule's dimension is less than the maximum value of every subsequent intersected rule's corresponding dimension. This process is shown in detail in FIG. 11. In FIG. 11, it is assumed that processor 32 has already determined which rules, if any, intersect in all dimensions as described above and shown in FIGS. 9 and 10. Here, rule 14 and rule 15 intersect in all dimensions, specifically source IP address and destination IP address.

Processor 32 may determine, per step 140, that the maximum value of a dimension k (here, destination IP address, 128.153.4.255) of particular rule 14 is less than the maximum value of the corresponding dimension (destination IP address, 128.153.255.255) of subsequent rule 15. Thus, because rule 14's k(max) for destination IP address is "within" rule 15's k(max) for the same dimension processor 32 may next determine whether rule 14's k(min) is within rule 15's k(min) for the same dimension, per step 142. Since it is, processor 32 may next execute step 144 to determine if all dimensions have been tested. Here, the dimension of source IP address has not been tested, so processor 32 may test that dimension next as shown in steps 146 and 140. Steps 140, 142, and 148 may then be executed by processor 32, and policy table 70 will be determined to be invalid as shown in step 148 because the maximum value of rule 14's source IP address range is greater than the maximum value of rule 15's source IP address range, and because the minimum value of rule 14's source IP address range is less than the minimum value of rule 15's source IP address range. Although FIG. 11 only illustrates this process being applied to one index rule i, and two dimensions k, it will be understood by those of ordinary skill in the art that the process may easily be repeated until all rules and all dimensions in a policy table have been tested.

When a policy table is invalid, processor 32 may send a signal to a system administrator via administrative interface 38, or processor 32 may disable one or more interfaces associated with the rules that intersect. Alternatively, the processor 32 may take no action at all in response to a determination that a table is invalid the response of processor 32 and, necessarily, router 36 to a determination that the policy table is invalid is governed by administrative rules set for processor 32 by a system administrator via administrative interface 38.

Figure 8:
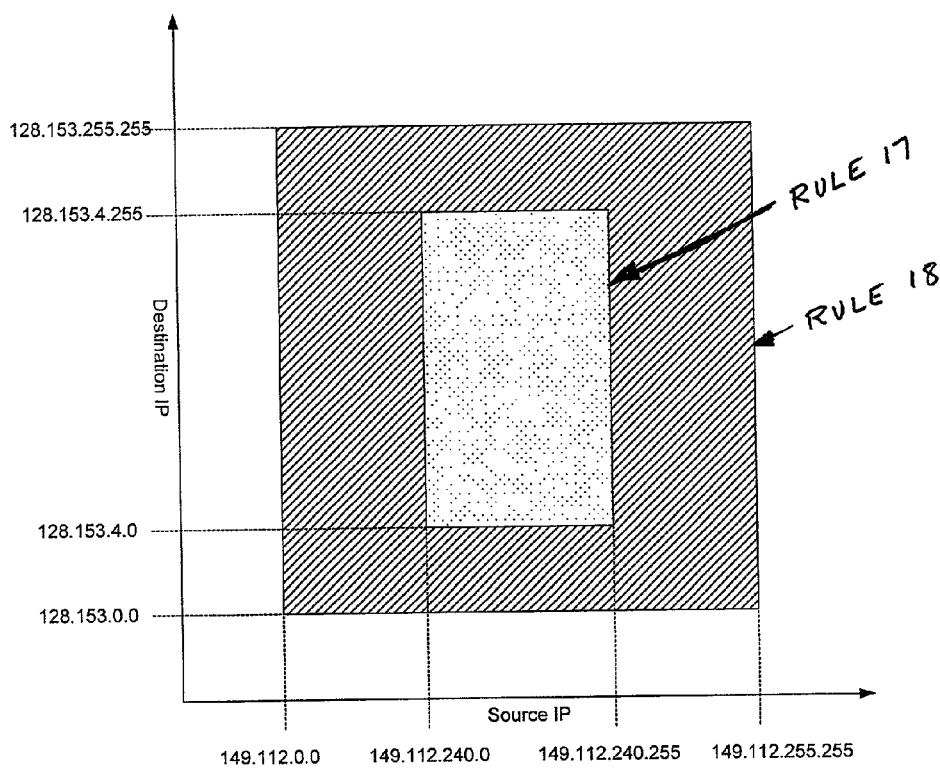
FIG. 8 illustrates a valid two-rule, two-dimension policy table and its corresponding graphical illustration of nested intersecting rules.

Finally, router 30 may determine that a policy table is valid even though one or more rules intersect in every dimension because each particular rule is a subset of every subsequent intersected rule. This condition is illustrated by FIG. 8. Processor 32 may accomplish this by determining that every minimum value of a particular rulers ranged dimension is greater than or equal to the minimum value of every subsequent intersected rule's corresponding ranged dimension, and also that every maximum value of a particular rule's ranged dimension is less than or equal to the corresponding maximum dimension of every subsequent intersected rule. If these conditions are met, the particular rule is a subset of the subsequent rule and the table may be valid.

For example, to determine the validity of policy table 70, processor 32 may determine first that rules 14 and 15 do intersect in every dimension, specifically, source IP address and destination IP address.

To complete the determnation, processor 32 may determine that the minimum value of a dimension (here, source IP address) of rule 14 is greater than the minimum value of the corresponding dimension (source IP address) of a subsequent rule, such as rule 15. Since the minimum value of rule 14's source IP address range is not greater than the minimum value of rule 15's source IP address range, and because rule 14 also intersects rule 15 in every other dimension (destination IP address in this case), policy table 70 is invalid.

FIG. 8 illustrates policy table 80 and a graphic representation of rules 17 and 18, each having two dimensions. Policy table 80 is valid because every particular rule in the table is a subset of every intersected subsequent rule in the table. Specifically, rule 17 intersects, but is a subset of, rule 18 in every dimension. If the order of the rules in the table were reversed, the table would be invalid, as will be discussed below. When a given rule is a subset of a broader rule (by definition, a narrow rule is a subset of a broader rule) that follows it in the table, the table will be valid if no other invalid conditions exist. As shown in FIG. 8, rule 17, which is narrower than rule 18, will always be applied to a packet that matches both rules.

Because rule 17 is checked before rule 18 and rule 17 is narrower than rule 18, rule 18 can never be improperly applied to a packet whose dimensions match both rules. In other words, a router that has a valid policy table will always assign the intended priority to data streams (for example, data streams sent by customers who have contracted for a particular QoS), even if the first rule that applies to a packet also coincidentally matches a broader subsequent rule. Similarly, if a narrow rule has a lower priority than a subsequent, broader rule, the router will make the most efficient use of its resources (e.g., bandwidth and buffer space) by applying the narrower policy rules before broader rules.

Processor 32 may determine that policy table 80 is valid using the same repetitive process described above for table 70. In this case, however, unlike policy table 70, every maximum dimension (k(max)) of rule 17 is less than or equal to every maximum dimension (k(max)) of rule 18, as determined in step 140, and every minimum dimension of rule 17 (k(min)) is greater than or equal to every corresponding minimum dimension of rule 18, as determined in step 142. In other words, the maximum and minimum source IP address represented by rule 17 is within the maximum and minimum source IP address represented by rule 18.

Similarly, the maximum and minimum destination IP address represented by rule 17 is within the maximum and minimum destination IP address represented by rule 18. Again, although this example illustrates only two rules with two dimensions, one of ordinary skill in the art will appreciate that steps 140 through 150 may be repeated as many time as necessary to determine the validity of a policy table with any number of rules and dimensions.

If, unlike table 80, a rule that had the same source and destination IP address ranges as rule 18 preceded rule 17, the table would be invalid because the broader rule would precede the narrower rule 17 in the table. The broader rule would thus prevent rule 17 from ever being applied to a packet, regardless of the priority of rule 17. As described above, a table that is invalid because a subsequent policy rule is a subset of a prior rule in the table will not allow the proper priority to be assigned to a data stream, resulting either in an expensive and inefficient use of a provider's resources or a customer not getting the QoS that the service provider intended.

Exemplary embodiments of the present invention have been illustrated and described. It will be understood, however, that changes and modifications may be made to the invention without deviating from the spirit and scope of the invention, as defined by the following claims.

We claim:

1. A method for validating an n-dimensional policy table in a router, the router having at least two interfaces, the policy table having at least two policy rules, and each policy rule in the policy table having at least one dimension, the method comprising:

making a first determination whether every dimension of any first policy rule intersects any subsequent policy rule in every dimension of the subsequent policy rule; and if the first determination is that none of the policy rules intersect each other in every dimension, then producing an output signal indicating that the policy table is valid and if the first determination is that any first policy rule of the policy table intersects any subsequent policy rule in every dimension, thereby defining a first and a second intersecting policy rule, making a second determination whether one of said first and second intersecting policy rules is a subset of the other of the said first and second intersecting policy rules.

2. The method of claim 1 wherein the second determination is whether every first policy rule that so intersects a subsequent policy rule is a subset in every dimension of every subsequent policy rule that it intersects; and if the second determination is that any first policy rule is not a subset in every dimension of every subsequent policy rule that it intersects, then producing an output signal indicating that the policy table is invalid, whereby the output signal may be used to generate an appropriate action.

3. The method of claim 2, further comprising:

controlling at least one of the at least two interfaces in response to the output signal.

4. The method of claim 2, further comprising:

if the second determination is that every first policy rule is a subset in every dimension of every subsequent policy rule that it intersects, then producing an output signal indicating that the policy table is valid, whereby the output signal may be used to generate an appropriate action.

5. The method of claim 2, wherein the second determination further comprises:

determining whether the maximum value of every dimension of every first policy rule that intersects a subsequent policy rule is less than the maximum value of every corresponding dimension of each subsequent policy rule that the first policy rule intersects; and determining whether the minimum value of every dimension of every first policy rule that intersects a subsequent policy rule is greater than the minimum value of every corresponding dimension of each subsequent policy rule that the first policy rule intersects; and if the maximum value of any dimension of a first policy rule is not less than a corresponding maximum value of every corresponding dimension of any subsequent policy rule that the first policy rule intersects, or if the minimum value of any dimension of a first policy rule is not greater than a corresponding maximum value of every corresponding dimension of any subsequent policy rule that the first policy rule intersects, determining that not every first policy rule that intersects a subsequent policy rule in every dimension is a subset in every dimension of every subsequent intersected policy rule.

6. The method of claim 1, further comprising:
if the first determination is that at least one first policy rule of the policy table intersects at least one subsequent rule in every dimension, making a second determination whether the at least one subsequent policy rule that so intersects the at least one first policy rule is a subset of the at least one first policy rule in every dimension; and
if the second determination is that the at least one subsequent policy rule is a subset in every dimension of the at least one first policy rule that it intersects, then producing an output signal indicating that the table may be made valid if the order of the intersecting rules is reversed.

7. The method of claim 1, wherein making the first determination further comprises:
determining whether the maximum value of at least one dimension of every first policy rule is less than the minimum value of a corresponding dimension of each subsequent policy rule; and
if the maximum value of any dimension of every first policy rule is less than the minimum value of a corresponding dimension of each subsequent policy rule, determining that the policy table is valid.

8. The method of claim 1, wherein making the first determination further comprises:
determining whether the minimum value of at least one dimension of every first policy rule is greater than the maximum value of a corresponding dimension of each subsequent policy rule; and
if the minimum value of any dimension of every first policy rule is greater than the maximum value of a corresponding dimension of each subsequent policy rule, determining that the policy table is valid.

9. A method for validating an n-dimensional policy table in a router, the router having at least two interfaces, the policy table having at least two policy rules, and each policy rule in the policy table having at least one dimension, the method comprising:
making a first determination whether any policy rules intersect by determining whether the maximum value of at least one dimension of every first policy rule is less than the minimum value of a corresponding dimension of each subsequent policy rule;
if the first determination is that the maximum value of any dimension of every first policy rule is less than the minimum value of a corresponding dimension of each subsequent policy rule, producing an output signal indicating that no policy rules intersect and the policy table is valid;
making a second determination whether any policy rules intersect by determining whether the minimum value of at least one dimension of every first policy rule is greater than the maximum value of a corresponding dimension of each subsequent policy rule;
if the second determination is that the minimum value of any dimension of every first policy rule is greater than the maximum value of a corresponding dimension of each subsequent policy rule, producing an output signal indicating that the policy table is valid;
if the first or second determination is that at least two policy rules intersect in every dimension, then making a third determination whether every first policy rule that intersects a subsequent policy rule is a subset of every intersected subsequent policy rule by determining whether the maximum value of every dimension of every first policy rule is less than the maximum value of every corresponding dimension of each subsequent policy rule that the first policy rule intersects, and whether the minimum value of every dimension of every first policy rule that intersects a subsequent policy rule is greater than the minimum value of every corresponding dimension of each subsequent policy rule that the first policy rule intersects;
producing an output signal indicating that the policy table is valid if the third determination is that every first policy rule is a subset of every subsequent policy rule that it intersects in every dimension;
producing an output signal indicating that the policy table is invalid if the third determination is that any first policy rule is not a subset of every subsequent policy rule that it intersects in every dimension;
whereby, any output signal may be used by the router to generate an appropriate action.

10. A router comprising, in combination:
at least two interfaces;
a processor;
a memory;
a policy table stored in the memory;
at least two policy rules stored in the policy table;
each policy rule having at least one dimension;
a verification routine executable by the processor (i) to make a first determination whether every dimension of any first policy rule intersects any subsequent policy rule in the policy table in every dimension, and (ii) to make a second determination whether any first policy rule that intersects a subsequent policy rule in every dimension is a subset of the subsequent policy rule in every dimension;
a signaling component that generates a signal in response to the first determination and the second determination.

11. The router of claim 10, further comprising a control component that controls at least one of the at least two interfaces in response to the first determination and the second determination.

12. A computer system for validating an n-dimensional policy table in a router comprising, in combination:
at least two interfaces;
a processor;
a memory;
a policy table stored in the memory;
at least two policy rules stored in the policy table;
each policy rule having at least one dimension;
a verification routine executable by the processor (i) to make a first determination whether every dimension of any first policy rule intersects any subsequent policy rule in the policy table in every dimension, and (ii) to make a second determination whether any first policy rule that intersects a subsequent policy rule in every dimension is a subset of the subsequent policy rule in every dimension;
a signaling component that generates a signal in response to the first determination and the second determination.

13. The computer system of claim 12, further comprising a control component that controls at least one of the at least two interfaces in response to the first determination and the second determination.

* * * * *